(12) United States Patent
Carlot et al.

(10) Patent No.: US 6,775,968 B2
(45) Date of Patent: Aug. 17, 2004

(54) MOWER HAVING ADJUSTABLE CROP DEFLECTOR

(75) Inventors: Philippe Carlot, Trouhans (FR); Jean Delmas, Rigny (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/298,618

(22) Filed: Nov. 15, 2002

(65) Prior Publication Data

US 2003/0121243 A1 Jul. 3, 2003

(30) Foreign Application Priority Data

Nov. 17, 2001 (DE) .......................................... 101 56 634

(51) Int. Cl.⁷ .............................................. A01D 43/10
(52) U.S. Cl. ...................................................... 56/192
(58) Field of Search .................... 56/144, 145, 16.4 A, 56/164.4 B, 192, DIG. 7, DIG. 21, 366

(56) References Cited

U.S. PATENT DOCUMENTS

| | | |
|---|---|---|
| 3,106,052 A | 10/1963 | Ingram |
| 3,224,177 A | 12/1965 | Adee |
| 3,383,844 A * | 5/1968 | Glass et al. ................... 56/14.4 |
| 3,841,070 A * | 10/1974 | Scarnato et al. ............. 56/14.4 |
| 5,894,716 A | 4/1999 | Haldeman et al. |
| 5,930,988 A | 8/1999 | Hanson |

FOREIGN PATENT DOCUMENTS

EP  A1-1 008 290  6/2000

* cited by examiner

*Primary Examiner*—Robert E. Pezzuto

(57) ABSTRACT

A mower-conditioner is provided with a crop deflector mounted at the end of an outlet guide element through the medium of a pair of slots provided in each of the opposite sides of the guide element and overlapping slots provided in slot-carriers in the form of flanges provided at opposite sides of a planar section of the deflector, with releasable fasteners securing the deflector in a desired one of an infinite number of possible positions permitted by the slot and fastener arrangement.

9 Claims, 7 Drawing Sheets

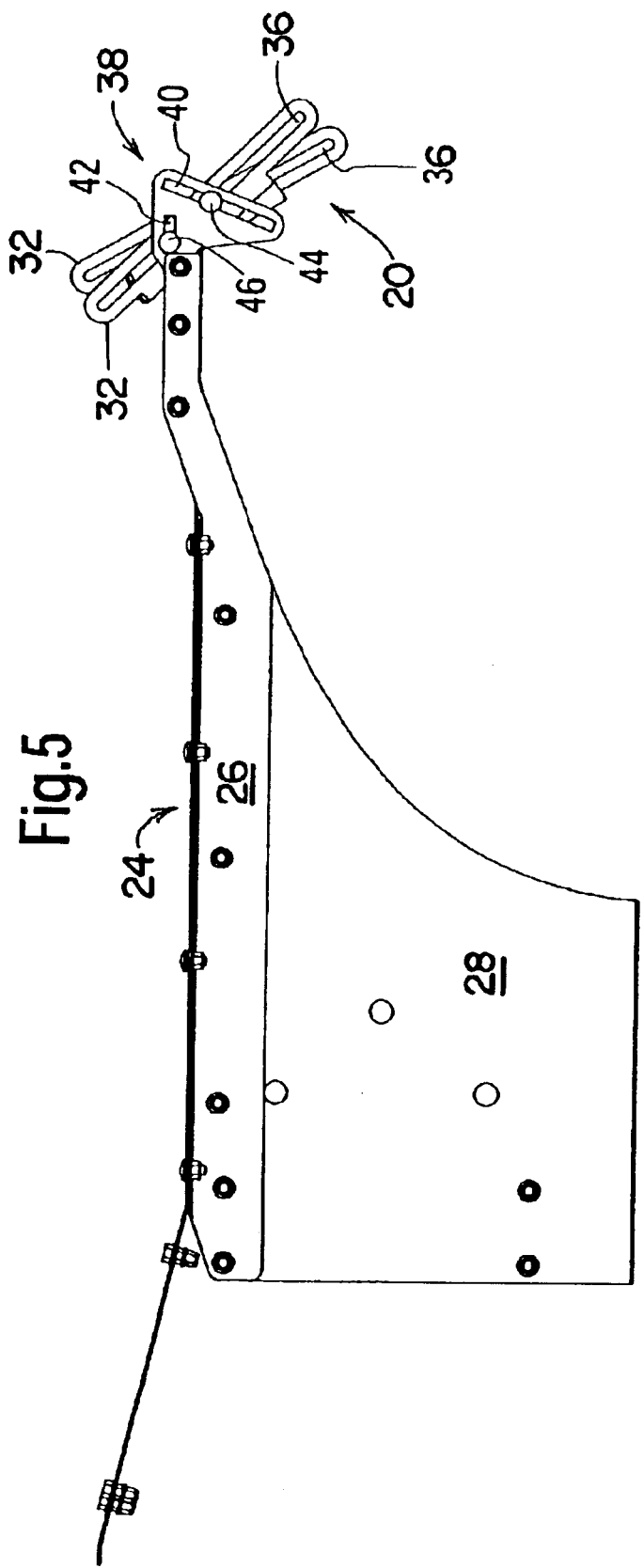

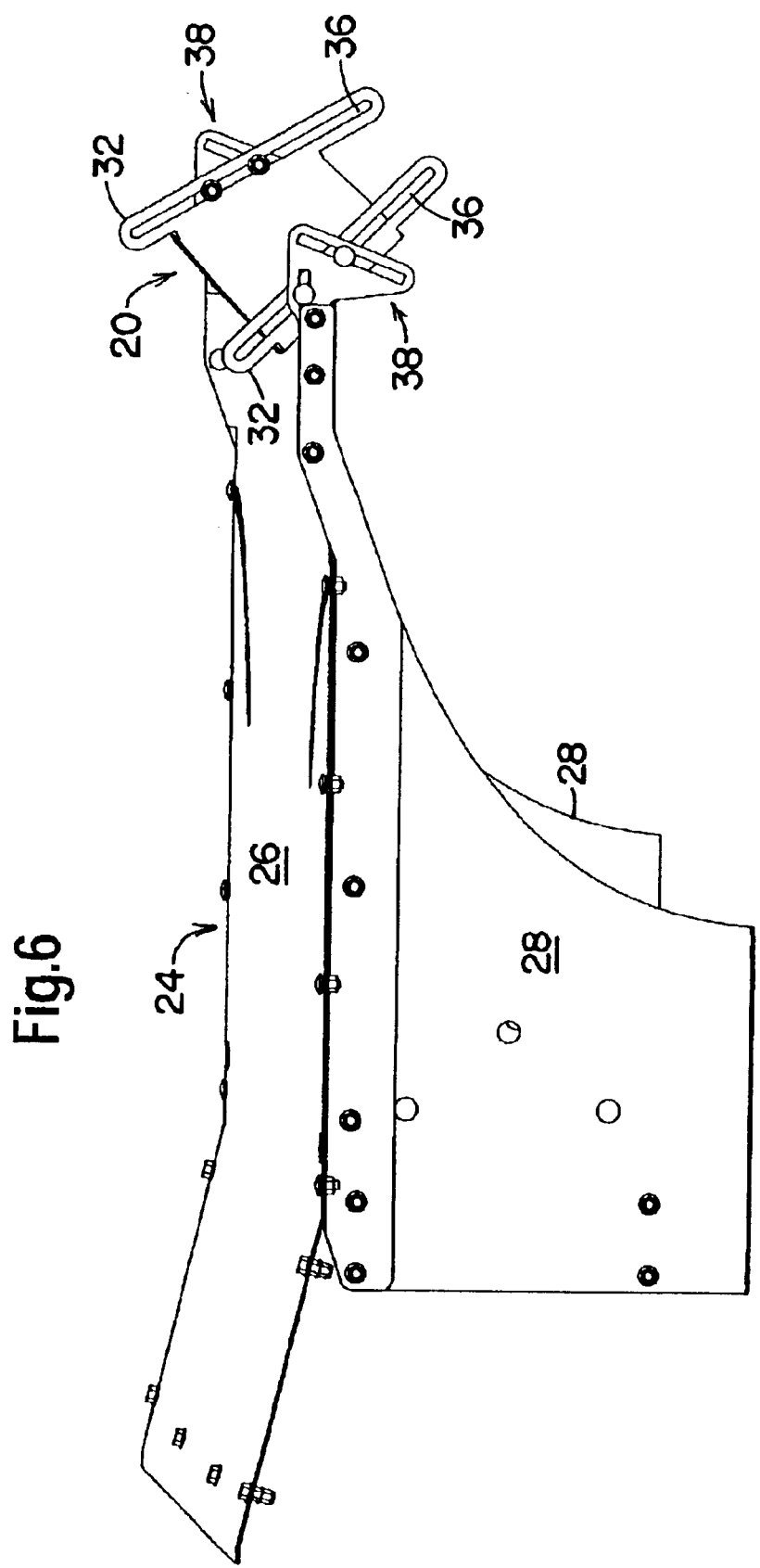

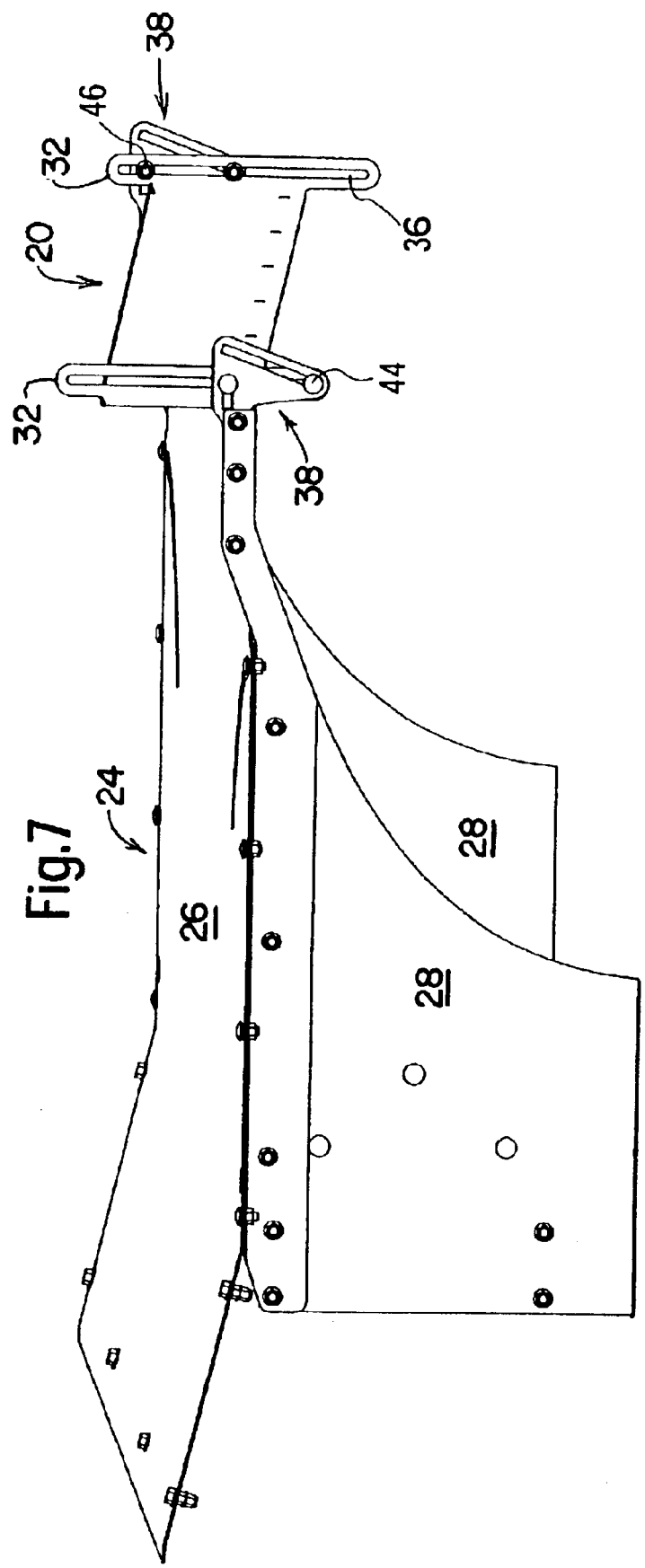

MOWER HAVING ADJUSTABLE CROP DEFLECTOR

FIELD OF THE INVENTION

The invention concerns a mower and/or crop processing implement with an outlet guide element and a deflector, that can be inserted into an outlet channel bordered by the outlet guide element.

BACKGROUND OF THE INVENTION

EP-A1-1 008 290 discloses a mower/tedder with a housing in which a rotor rotates that is oriented transverse to the flow of the crop and in whose outlet region a deflector is provided. This deflector is configured in the shape of a "U" and is provided with a bearing leg that can engage a bearing and pivot vertically above the housing. A planar element provided on the deflector may be oriented parallel or generally vertically to the underside of the housing cover. Furthermore the planar element can also be pivoted completely out of the crop flow, which, indeed, is functionally equivalent to the position parallel to the underside of the housing cover.

U.S. Pat. No. 3,224,177 reveals a mower-crimper-tedder in whose outlet a deflector is also provided that can be pivoted about a horizontal axis. In each side wall of the outlet guide element, a screw is provided that extends through a slot in the side wall of the deflector and thereby can fix the location of the deflector in various vertical positions.

The problem underlying the invention is seen in the fact that the known repositioning possibilities are not adequate for today's requirements.

SUMMARY OF THE INVENTION

This problem is solved according to the invention by providing a crop deflector mounted by a simple construction using slots and bolts so as to make it possible to place the deflector in a multitude of selected positions.

In this way, the deflector can be repositioned in more than only one direction, where the repositioning possibilities can be affected by the position and the shape of the slots. The slots can also be configured in the form of grooves or other slide guides, so that, in any case, at least one guide path is provided. The deflector may be rigid in itself, for example, of sheet metal or it may contain a strong cloth that extends between two retainers. The fixed positioning element may be a simple screw, as well as a toggle lever clamp with which the deflector can be retained on the outlet guide element in a positive or a friction lock. In its simplest form, the outlet guide element consists of a generally plane sheet metal component and otherwise of a U shaped channel. Mowers may deposit crop that has been mowed directly behind the implement or conduct it to a processing implement from where it reaches the ground. On the other hand, a processing implement can also be operated alone that takes up crop that has been mowed previously, processes it, for example, crimps it, and then deposits it. In both cases, the deflector enters the flow of the crop and deflects it to a wider or narrower width.

The use of a second slot in the outlet guide element or the deflector, that is, the use of a total of three slots increases the possibilities for repositioning. In particular, the deflector can now be twisted or located at an angle and thereby steers the flow of the crop delivered to one side or the other. If the final edge of the deflector extends parallel to a guide surface of the outlet element, then the ejected crop may, for example, be deposited uniformly on the ground. If the deflector is twisted or set at an angle, then an end edge of the deflector deposits the crop unevenly, for example, to the left or the right, or more strongly or weaker upward or downward.

The advantage of a smooth boundary of the slot lies in the fact that the position fixing element, and with it the deflector, can be moved smoothly without steps and without resistance in or relative to the slot. Thereby, an infinite number of positions of the deflector are possible. The advantage of recesses, for example, small bays or grooves, lies in the fact that advantageous positions can easily be found again and that the position fixing elements need not retain the deflector on the outlet guide element solely by friction forces alone, but that positive locking forces are also effective.

An orientation of the slots at right angles to each other provides the largest number of repositioning possibilities, since a repositioning in two directions can be accomplished. Furthermore, external forces in one direction are absorbed in positive locking on one wall.

Since a deflector must principally be able to enter into the flow of the crop, it is advantageous that the repositioning possibilities in this direction are enhanced by a relatively long slot. On the other hand, a short slot in one direction of adjustment is sufficient and uses only a little material to accommodate the slot for only a minor adjustment of the deflector, for example, for the control of the inclination.

A triangular slot carrier, for example, in the shape of an "L" of plate material or of profiles, represents an optimum use of material to accommodate two slots. Such a slot carrier, for example, punched from sheet metal, can be provided on each side of the outlet guide element.

If the slot carrier is longer than the height or the width of the deflector, the planar element can be brought out of the region of the flow of the crop, while the other slot carrier can still remain at the side of the flow of the crop.

The configuration of the deflector, as a one-piece component, results in lower manufacturing costs, since the necessary shaping can be performed in a single pass of a punch.

BRIEF DESCRIPTION OF THE DRAWINGS

The drawing shows an embodiment of the invention that shall be described in greater detail in the following.

FIG. 5 is a side view of the outlet guide element and the deflector in a fourth, twisted position, an operating position with partial deflection, that deflects the flow of the crop more strongly to one side than to the other side.

FIG. 6 is a perspective view of the outlet guide element and the deflector of FIG. 5.

FIG. 7 is a perspective side view of the outlet guide element and the deflector in a fifth position set at an angle, an operating position.

DESCRIPTION OF THE PREFERRED EMBODIMENT

Figure 1:
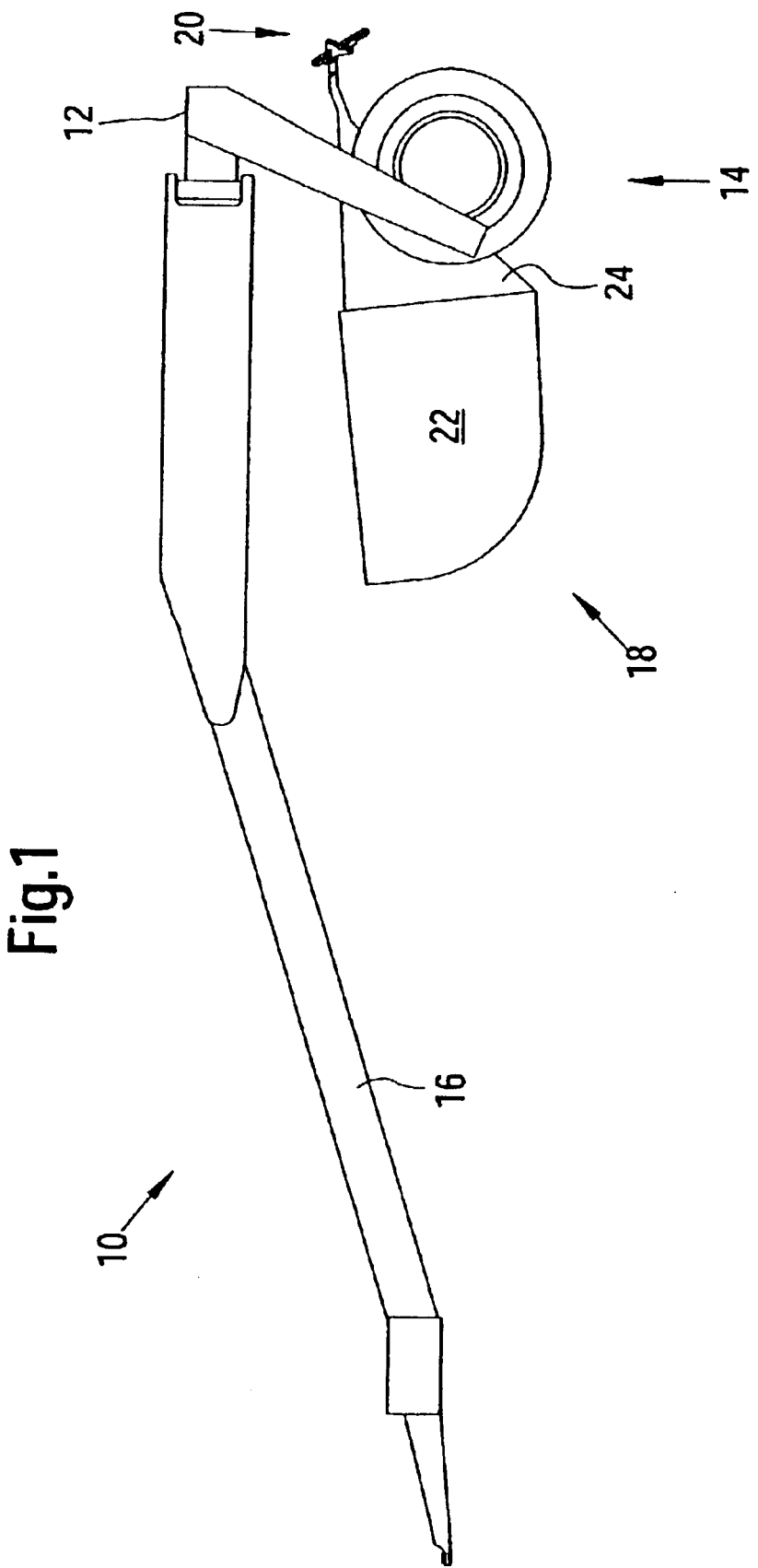
FIG. 1 shows a schematic side view of a mower and processing implement with an outlet guide element and a deflector.

FIG. 1 shows a mower and crop processing implement 10 with a frame 12, a running gear 14, a towbar 16, a mower and processing arrangement 18, and a deflector 20.

The mower and processing implement 10 is shown as a towed implement, but may equally well be mounted on a towing vehicle or may be part of a self-propelled vehicle. The task of the mower and processing implement 10 is to mow crop standing on the ground, to process it, and to deposit it to the rear in a swath on the ground.

The frame 12 is configured in a conventional manner as an inverted "U", is supported by the running gear 14, carries the mower and processing arrangement 18, and is connected by the towbar 16 to a towing vehicle, not shown.

In its simplest configuration, the running gear 14 consists of a wheel, not described in any greater detail, on each side that is suspended from the frame 12 by pivotable wheel support arms and servo motors (not shown).

The towbar 16 is used to connect the frame 12 to the towing vehicle and extends far ahead of the mower and processing arrangement 18.

The mower and processing arrangement 18 contains in a way not shown, but known adequately, a mower head and a processing arrangement that follows it downstream that is in the form of a rotor rotating about a horizontal axis, that is enclosed in a housing 22, which is followed by an outlet guide element 24. The rotor conveys, as an overshot conveyor, the crop that has been mowed and processed to the rear, that is, to the right in FIG. 1, where it is conducted along the inner surface of the outlet guide element 24 up to the deflector 20.

The deflector 20 is provided in the outlet region of the outlet guide element 24 and contains a planar element 30 and a slot carrier 32 on each side. The deflector 20 is used to control the position of the crop in one swath on the ground, or the direction of its ejection. In that way, for example, a wide swath can be produced in that the planar element 30 deflects the flow of the crop in a region in which the side walls 28 maintain a large distance to each other. On the other hand, a narrow swath is produced when the planar element 30 does not impede the flow of the crop and lets it slide along the side walls 28 converging towards each other. If the mower and processing arrangement is followed by a swath depositing arrangement, for example, with a belt conveying in the sideways direction, that extends at an angle to the direction of operation of the mower and processing arrangement, a corresponding orientation of the deflector 20 can also produce the result that the crop is deflected, on the one hand earlier and on the other hand later, so that it can be thrown on the entire length of the belt in its central region.

The planar element 30 is configured as a sheet metal component, but could also consist of plastic or rubber or the like. On one of the edges extending transverse to the flow of the crop, a flanged edge at 90° is provided that assures adequate stiffness in bending. The planar element 30 extends over the entire width at the end of a tapered outlet channel 33 formed between the side walls 28. The planar element 30 can be provided with creases, ribs or the like that increase its stiffness further. In addition, further guide elements could be provided on its guide side.

The slot carriers 32 are configured as flat ribs that extend at an angle of approximately 90° to the planar element 30 and are fastened to it. The slot carriers 32 extend on both sides beyond the planar element 30, in particular on one side more than on the other side. In each slot carrier 32, a straight first slot 36 is provided that extends parallel to the surface of the planar element 30.

In this embodiment, the planar element 30 and the slot carriers 32 are configured as a single part that is formed by a sheet metal plate, stamped in a press, and flanged to correspond. Alternatively, these components could also be screwed or welded together. Broadly speaking, the deflector 20 takes the form of an "H", where the planar element 30 forms the crossbar.

The outlet guide element 24 is configured in the shape of a "U"-shaped sheet metal channel that opens downward and contains a cover 26 and two side walls 28, where in this special embodiment, the cover 26 extends beyond the side walls 28 towards the rear. The side walls 28 converge from the mower and processing arrangement 18 to the outlet end. In the rear end region of the cover 26, a further slot carrier 38 is provided on each side.

The further slot carrier 38 takes the shape of a triangle that is stamped from a stable, yet flexible, sheet metal. The further slot carriers 38 are connected with the cover 26 and/or the particular side wall 28, and in each case extend vertically; the connection is made simply by a screw connection. In the slot carrier 38, a second and a third slot 40 and 42, are provided that also extend in a straight line. In the assembled condition of the slot carrier 38, the slot 40 extends nearly vertically, but slightly inclined, and is relatively long. The slot 42 extends horizontally along the upper edge of the slot carrier 38 and is relatively short. The slots 40 and 42 are separate from each other. The two slot carriers 38 are arranged parallel to each other and enclose the deflector 20 between them.

Finally, fixed positioning elements 44 and 46 are provided that extend in one case through the first and the second slots 36 and 40, and in another case, extend through the first and the third slots 36 and 42. The fixed positioning elements 44 and 46 are defined by screws, nuts, and washers that are arranged to hold the slot carriers 32 and 38 against each other so that they cannot be separated.

On the basis of the foregoing description, the result is the following assembly and the following operation.

The deflector 20 is positioned between the two vertical slot carriers 38 in such a way that the first slot 36 in the slot carrier 32 of the deflector 20 intersects the second slot 40 as well as the third slot 42 of the slot carrier 38 on the outlet guide element 24. As soon as this has taken place, the fixed positioning elements 44 and 46 are inserted and tightened. FIGS. 2 through 7 show five differing positions of the deflector 20 that are possible on the basis of the use of the several slots 36, 40, and 42.

Figure 2:
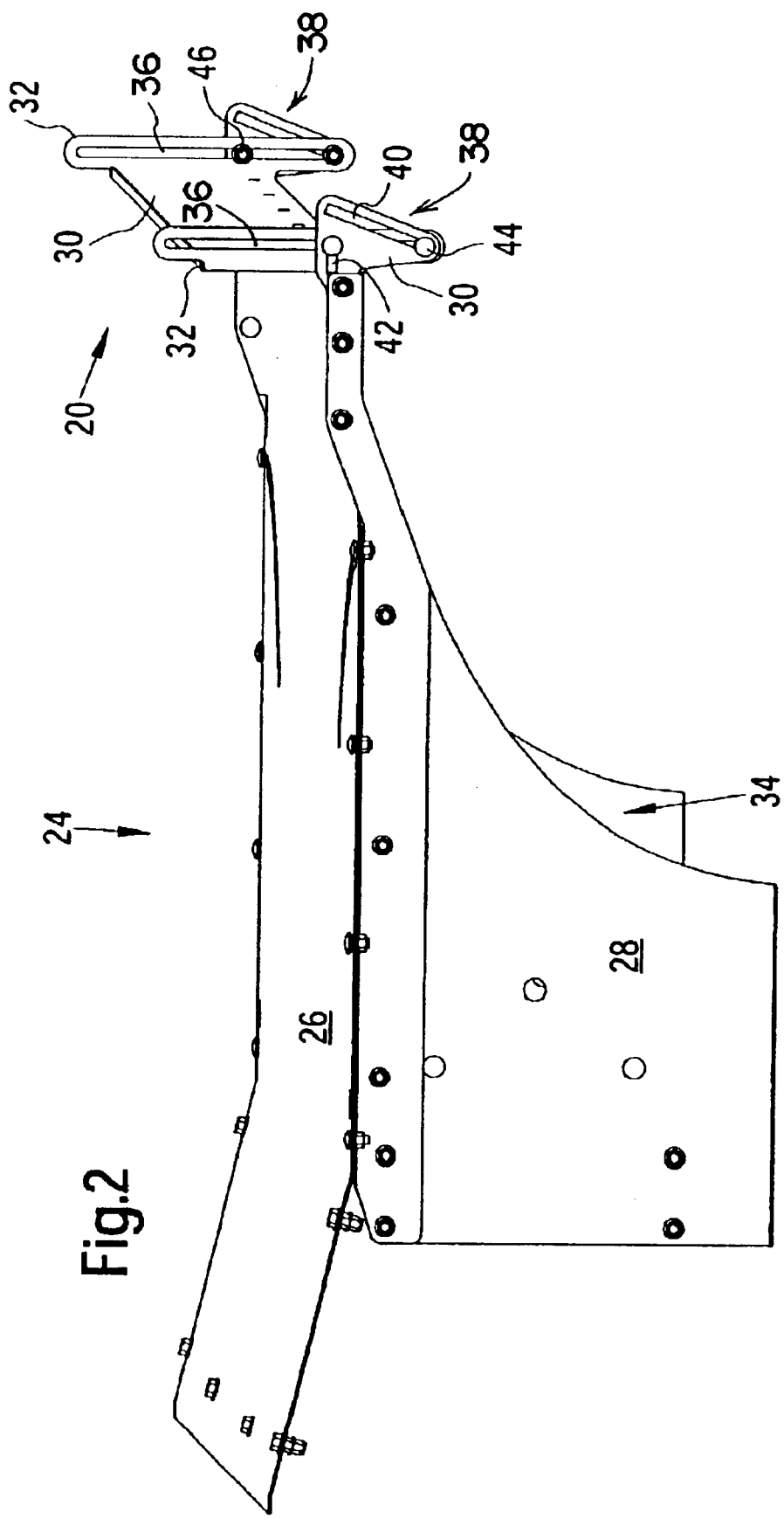
FIG. 2 is a left front perspective view of the outlet guide element and the deflector in a first or non-operating position.

In that way, FIG. 2 shows an orientation in which the planar element 30 extends vertically above the cover 26 and does not touch the flow of the crop. In this position, the upper positioning element 46 is located at the rear end of the slot 42 and an intermediate location of the slot 36, while the lower positioning element 44 is located at the lower ends of the slots 42 and 40.

Figure 3:
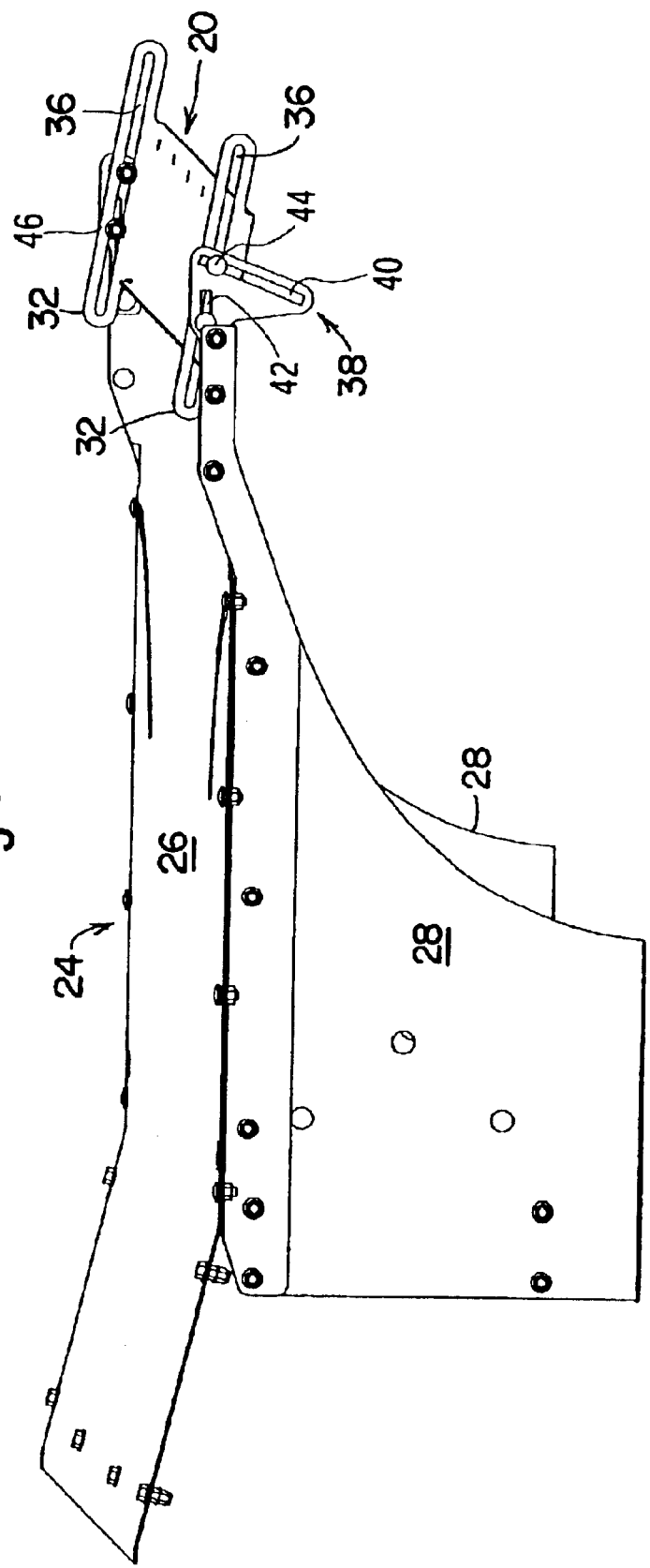
FIG. 3 is a view like that of FIG. 2, but showing the outlet guide element and the deflector in a second or operating position wherein it will effect little deflection on the stream of crop.

FIG. 3 shows a position in which the fixed position elements 44 and 46 are respectively located at or near the rear and upper ends of the second and the third slots 40 and 42 while they are each positioned close to the center in the first slot 36. The planar element 30 now assumes a position inclined slightly downward in which the crop is deflected only to a small degree.

Figure 4:
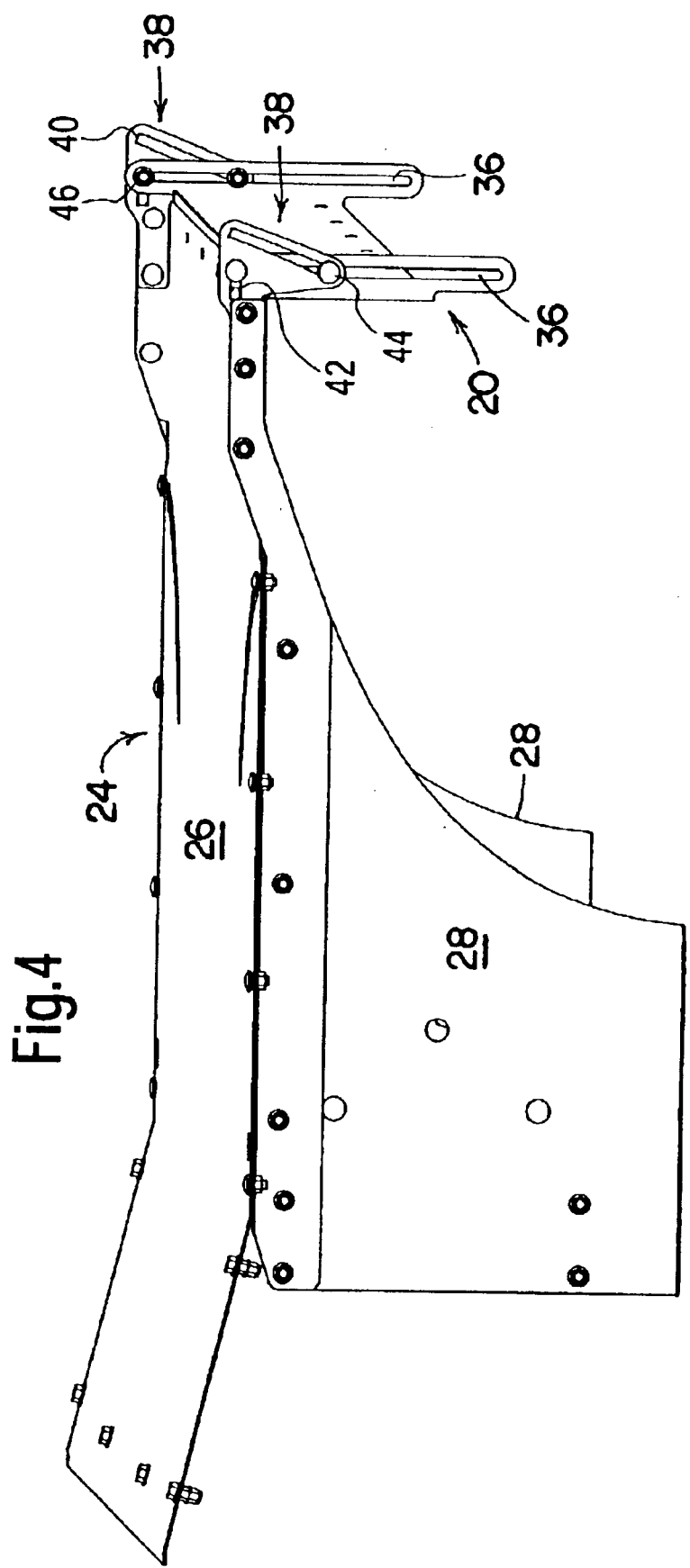
FIG. 4 is a view like that of FIG. 2, but showing the outlet guide element and deflector in a third or further operating position wherein it will effect maximum deflection of the stream of crop so as to result in formation of a wide swath.

The position according to FIG. 4 corresponds in a certain respect to that of FIG. 2, however, the deflector 20 is here shown located at the very bottom of its range of movement wherein it fully extends into the flow of the crop. In this case, the positioning elements 46 are in contact with the upper end of the first slots 36. The position of the positioning elements 44 and 46 in the second and the third slots 40 and 42 corresponds to that of FIG. 2.

FIGS. 5 and 6 demonstrate a position of the deflector 20, in which it and particularly its planar element 30, is twisted. While the fixed positioning elements 44 and 46 are arranged in the central region of the first slot 36, they occupy differing positions in the second and the third slots 40 and 42 that result in the twisting.

Finally from FIG. 7, a position of the deflector 20 is revealed in which it is oriented at an angle, so that its left side is at a greater distance to the ground than its right side, resulting in a deflection of the flow of the crop towards one side. In the illustration that is somewhat exaggerated, the fixed positioning element 44 is located, on the one hand, at one end of the slot 36, and on the other hand, the fixed positioning element 46 is located at the other end of the slot 36 on the opposite side. Such an orientation is possible, among other reasons, because the slot carriers 32 and 38 can deflect.

Having described the preferred embodiment, it will become apparent that various modifications can be made without departing from the scope of the invention as defined in the accompanying claims.

What is claimed is:

1. In a mowing implement equipped for causing cut crop to flow airborne in a rearward direction along a path through an outlet channel defined by an outlet guide element, and a deflector being mounted to said guide element for selective insertion into said path, the improvement comprising: said outlet guide element being U-shaped in vertical cross-section and having opposite side walls depending from a cover; said deflector extending between said opposite side walls; each of said deflector and outlet guide element being provided with at least a first slot, with said first slot of said deflector being disposed upright, when said deflector is in an elevated first position disposed above said path, and overlapping said upright first slot of said guide element; and at least one positioning element extending through the overlapping first upright slots and being releasably secured for fixing said deflector element in a desired position relative to said path.

2. The mowing implement, as defined in claim 1, wherein said outlet guide element includes at least a first generally horizontal slot also overlapping said at least first upright slot of said deflector; and a second positioning element being received through said first generally horizontal slot and said at least first upright slot of said deflector.

3. The mowing implement, as defined in claim 2, wherein said first generally horizontal slot is arranged at approximately a right angle to said at least first slot of said outlet guide element.

4. The mowing implement, as defined in claim 2, wherein said first upright slot of each of said outlet guide element and said deflector are located at respective first sides of said outlet guide member and deflector; a second upright slot being located in each of respective second sides of said outlet guide member and deflector in overlapping relationship to each other; and a third positioning element being located in said second upright slots.

5. The mowing implement, as defined in claim 1, wherein said at least first slots in said outlet guide member and said deflector are of differing lengths.

6. The mowing implement, as defined in claim 5, wherein said outlet guide element includes at least a first generally triangular slot carrier at a first of its opposite sides; said first triangular slot carrier being in the form of a vertically disposed plate; and said at least first upright and generally horizontal slots of said first generally triangular slot carrier respectively extending along two sides of said first generally triangular slot carrier.

7. The mowing implement, as defined in claim 1, wherein said deflector includes a planar element extending between respective slot carriers, at opposite sides of said planar element, that extend beyond the planar element; and said first upright slot of said deflector being provided in one of said slot carriers of said deflector and a second upright slot being located in another of said slot carriers of said deflector; said outlet guide element including a second upright slot overlapping said second upright slot of said deflector; and a third positioning element being located in said second upright slots.

8. The mowing implement, as defined in claim 7, wherein said first generally triangular slot carrier is located at a first side of said outlet guide element; a second generally triangular slot carrier being located at a second side of said outlet guide element in transversely spaced relationship to said first generally triangular slot carrier and containing said second upright slot; and said deflector, being constructed of a single sheet metal component including said slot carriers.

9. The mowing implement, as defined in claim 8, wherein at least one of said deflector and said triangular slot carriers of said guide element are flexible so as to permit said deflector to be mounted with one side higher than an opposite side so as to cause crop to be deflected to one side or another of a central plane passing through said path.

* * * * *